United States Patent
Shimizu et al.

(10) Patent No.: US 7,846,358 B2
(45) Date of Patent: Dec. 7, 2010

(54) METHOD OF CONTROLLING INJECTION MOLDING MACHINE

(75) Inventors: Kenichi Shimizu, Nagano-ken (JP); Hideo Sakai, Nagano-ken (JP)

(73) Assignee: Nissei Plastic Industrial Co., Ltd., Nagano-Ken (JP)

(*) Notice: Subject to any disclaimer, the term of this patent is extended or adjusted under 35 U.S.C. 154(b) by 15 days.

(21) Appl. No.: 12/467,322

(22) Filed: May 18, 2009

(65) Prior Publication Data

US 2009/0297650 A1    Dec. 3, 2009

(30) Foreign Application Priority Data

May 29, 2008   (JP)  ............................. 2008-140640

(51) Int. Cl.
   *B29C 45/82* (2006.01)
(52) U.S. Cl. .................. 264/40.1; 264/40.5; 264/328.1; 425/149
(58) Field of Classification Search ................. 425/145, 425/149; 264/40.1, 40.5, 328.1
See application file for complete search history.

(56) References Cited

U.S. PATENT DOCUMENTS

| | | | | |
|---|---|---|---|---|
| 3,911,677 A | * | 10/1975 | Collins | .................. 60/368 |
| 5,762,973 A | * | 6/1998 | Holzschuh | .................. 425/145 |
| 6,748,739 B1 | * | 6/2004 | Hirano et al. | .................. 60/431 |
| 2003/0042640 A1 | * | 3/2003 | Kubota | .................. 264/40.1 |
| 2006/0127520 A1 | * | 6/2006 | Lu | .................. 425/146 |
| 2007/0052138 A1 | * | 3/2007 | Yamaura et al. | .................. 264/328.11 |

FOREIGN PATENT DOCUMENTS

JP    2007-69500 A    3/2007

* cited by examiner

*Primary Examiner*—Jill L Heitbrink
(74) *Attorney, Agent, or Firm*—Birch, Stewart, Kolasch & Birch, LLP

(57) ABSTRACT

When the number of rotations of a drive motor (3) driving a hydraulic pump (2) is variably controlled and thus each operation process in a molding cycle is controlled, as the hydraulic pump (2), a hydraulic pump (2) that can set at least a high fixed discharge flow rate (Qm) and a low fixed discharge flow rate (Qs) lower than the high flow rate is used, limit conditions for a threshold for the load condition of the drive motor (3) are preset and, during a molding operation, by setting a predetermined operation process at the high fixed discharge flow rate (Qm), the operation process is controlled and, when the load condition of the drive motor (3) is monitored and the load condition reaches the limit conditions, the flow rate is switched to the low fixed discharge flow rate (Qs) to control the predetermined operation process.

11 Claims, 4 Drawing Sheets

METHOD OF CONTROLLING INJECTION MOLDING MACHINE

TECHNICAL FIELD

The present invention relates to a method of controlling an injection molding machine that variably controls the number of rotations of a drive motor driving a hydraulic pump to control a predetermined operation process in a molding cycle.

BACKGROUND ART

Conventionally, as a method of controlling an injection molding machine that variably controls the number of rotations of a drive motor in a hydraulic pump, that, based on this, drives and controls a hydraulic actuator such as an injection cylinder (a hydraulic cylinder) and that controls operation processes in a molding cycle, a method of controlling an injection molding machine that is disclosed in Patent literature 1 is known.

In such a control method, when the number of rotations of the drive motor in the hydraulic pump is variably controlled and thus the operation processes in the molding cycle are controlled, as the hydraulic pump, a hydraulic pump is used in which at least a plurality of fixed discharge flow rates can be set, the fixed discharge flow rate corresponding to each operation process is preset based on predetermined conditions and, during a molding operation, the hydraulic pump is switched to the fixed discharge flow rate corresponding to each operation process, with the result that the number of rotations of the drive motor is variably controlled and thus the operation processes are controlled. With this control method, it is possible for the drive motor to use the hydraulic pump as at least either a small-capacity hydraulic pump or a large-capacity hydraulic pump. Advantageously, this makes it possible to, for example, eliminate an additional measure for an unstable condition in which the number of rotations of the drive motor is decreased or to reduce the level of such a measure, with the result that energy saving can be enhanced and the running cost can be reduced; this also makes it possible to decrease the size of the drive motor (servo motor) to reduce the initial cost of the entire machine including a servo circuit and the like; and, furthermore, this also makes it possible to stabilize the control to improve moldability and molding quality.

SUMMARY OF INVENTION

Technical Problem

However, this conventional method of controlling an injection molding machine suffers from the following problems to be solved.

A first problem is as follows. Since operation processes in a molding cycle in which a high flow rate is required, specifically, such as an injection process (a filling process and a pressure maintaining process) are completed in a relatively short period, when the fixed discharge flow rate of a hydraulic pump is set at a high flow rate (a large-capacity type), a drive motor may be set to produce a high output (about 130% of a rated output) that encounters no problem as long as the drive motor is operated for a short period. In this case, when the operation is normally performed, a problem is not encountered in particular, but when an overload is produced due to any failure or the pressure maintaining process is performed for a longer period, the drive motor is stopped (tripped) due to the overload and the molding cycle (molding operation) is interrupted. Consequently, this results in reduced production efficiency, and contributes to decreased molding quality and yield.

A second problem is as follows. Since a plurality of fixed discharge flow rates are individually set according to each operation process such as a measurement process, and the injection process (the filling process and the pressure maintaining process), it is likely that such a condition is not always optimal for the drive motor (hydraulic motor). For example, since almost no flow is required in the latter step of the pressure maintaining process, a high flow rate is little required; since a high fixed discharge flow rate is set for the entire pressure maintaining process, even if the drive motor is not overloaded, failures occur that impose an excessive and unnecessary burden, increase consumption energy or cause other problems.

Solution to Problem

To overcome the above problems, in a method of controlling an injection molding machine according to the present invention, when the number of rotations of a drive motor 3 driving a hydraulic pump 2 is variably controlled and thus each operation process in a molding cycle is controlled, as the hydraulic pump 2, a hydraulic pump 2 that can set at least a high fixed discharge flow rate Qm and a low fixed discharge flow rate Qs lower than the high flow rate is used, limit conditions for a threshold for the load condition of the drive motor 3 are preset and, during a molding operation, by setting a predetermined operation process at the high fixed discharge flow rate Qm, the operation process is controlled and, when the load condition of the drive motor 3 is monitored and the load condition reaches the limit conditions, the flow rate is switched to the low fixed discharge flow rate Qs to control the predetermined operation process.

Advantageous Effects of Invention

With the method of controlling an injection molding machine as described above and according to the present invention, the following significant benefits are obtained.

(1) Even if an excessive load occurs due to any failure or a predetermined operation process is performed for a longer period, it is possible to prevent a drive motor 3 from being stopped (tripped) due to overload. Thus, since production can be performed continuously without a molding cycle (a molding operation) being interrupted, it is possible not only to increase production efficiency but also to help improve the quality and yield of molded products.

(2) It is possible not only to prevent the drive motor 3 from being overloaded but also to set the drive motor 3 at an optimum threshold (limit conditions). This makes it possible to avoid failures that impose an excessive and unnecessary burden on the drive motor 3 (the hydraulic pump 2) or increase consumption energy, with the result that an optimum operation condition can be set.

(3) When one or both of the loads pressure Ps and an elapsed time Ts are used as limit conditions according to a preferred aspect, it is possible to accurately detect the load condition of the drive motor 3 to advantageously perform the control method of the present invention easily and accurately.

(4) When a variable discharge hydraulic pump 2x that can set the fixed discharge flow rates Qm and Qs by varying the inclined plate angle Rs is used as a hydraulic pump 2 according to another preferred aspect, since only one variable discharge hydraulic pump 2x allows an operation to be performed, it is possible not only to smoothly switch between the fixed discharge flow rates Qm and Qs but also to advantageously help reduce the size of the entire hydraulic circuit.

(5) By using, as a drive motor 3, a servo motor 3s connected to a servo circuit 3sa according to another preferred aspect, it is possible to easily and accurately perform the control method according to the present invention and to more effectively obtain the function benefits from the control method.

(6) When at least an injection process Si including a filling process Sic and a pressure maintaining process Sip is used as a predetermined operation process according to another preferred aspect, the injection process Si, where the problems to be solved by the present invention occur significantly, can be improved, with the result that the most effective performance can be obtained.

(7) According to another preferred aspect, when the limit conditions are reached, a predetermined abnormality process including a display process is performed. Thus, it is possible to quickly detect abnormality to tale a measure for the abnormality. This advantageously makes it possible to minimize influence on the entire production.

DESCRIPTION OF EMBODIMENTS

The present invention will now be described in detail, using a preferred embodiment of the invention, based on the accompanying drawings. The accompanying drawings are not used for limiting the present invention but are used to make the invention easily understood. The detailed description of known parts will be omitted so as not to make the invention unclear.

The configuration of an injection molding machine that can perform a control method according to this embodiment will first be described with reference to FIGS. 2 and 3.

Figure 2:
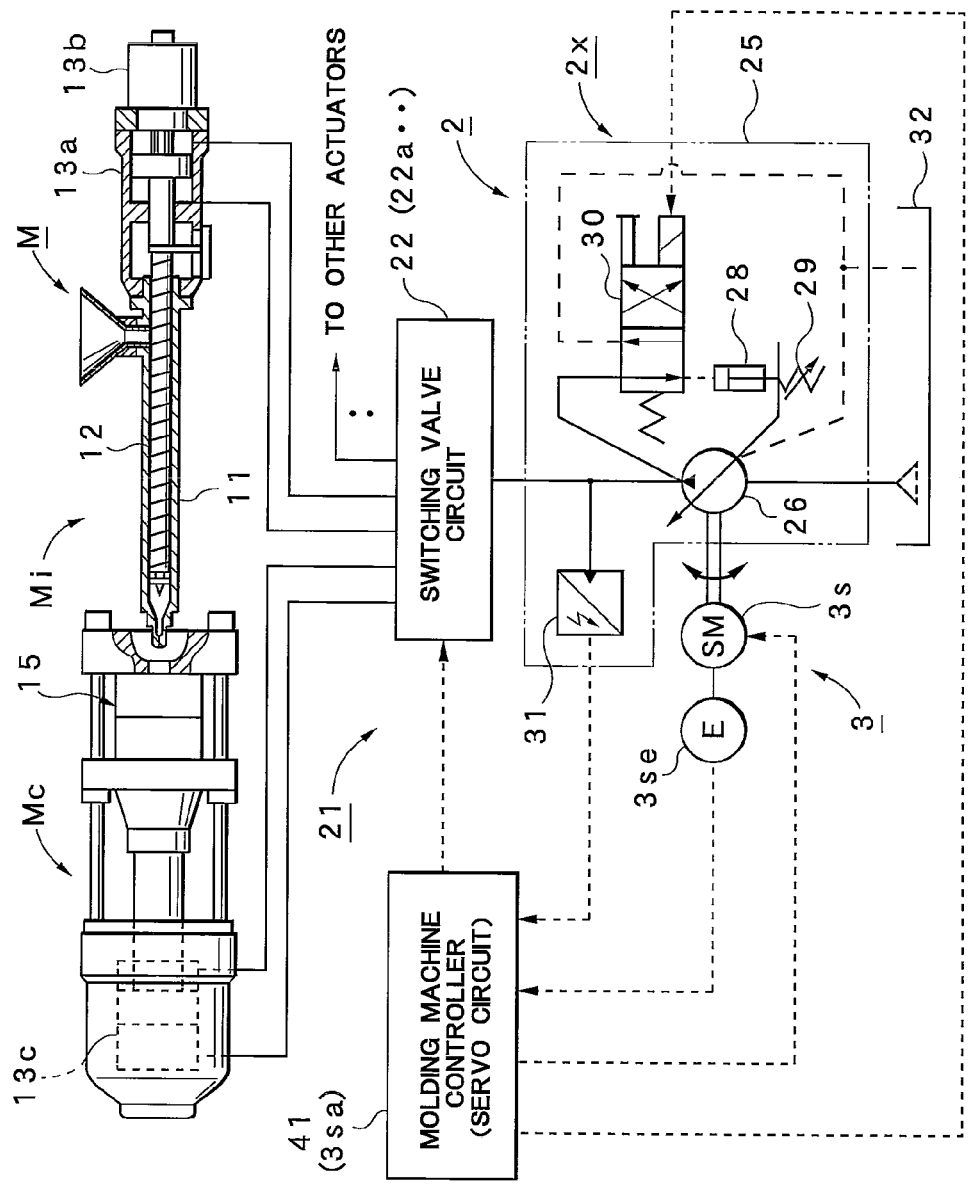
FIG. 2 is a diagram showing the configuration of the injection molding machine that includes its hydraulic drive portion used for performing such a control method.

In FIG. 2, the reference numeral M represents an injection molding machine; the injection molding machine M is provided with an injection device Mi and a mold clamping device Mc. As hydraulic actuators (13a . . . ), the injection molding machine M is provided with: an injection cylinder 13a that moves forward and backward a screw 12 incorporated in a heating cylinder 11 in the injection device Mi; a measurement motor (an oil motor) 13b that rotates the screw 12; a mold clamping cylinder 13c that opens and closes a mold 15 in the mold clamping device Mc and that clamps the mold 15; and a protruding cylinder 13d (see FIG. 3) that protrudes (ejects) a molded product in the mold 15. The injection molding machine M is also provided with an injection device moving cylinder 13e (see FIG. 3) that moves the injection device Mi forward and backward to touch the mold 15 with a nozzle or to move apart from it.

The reference numeral 21 represents a hydraulic drive portion; the hydraulic drive portion 21 is provided with a variable discharge hydraulic pump 2x (a hydraulic pump 2) serving as a hydraulic drive source and a switching valve circuit 22. The variable discharge hydraulic pump 2x is provided with a pump portion 25 and a servo motor 3s (a drive motor 3) for rotationally driving the pump portion 25. In this case, as the servo motor 3s, an alternating-current servo motor connected to a servo circuit (a servo amplifier) 3sa is used, and the servo motor 3s is provided with a rotary encoder 3se for detecting the number of rotations of the servo motor 3s. By using, as the drive motor 3, the servo motor 3s connected to the servo circuit 3sa, it is possible to easily and accurately perform the control method according to the present invention and to more effectively obtain the function benefits from the control method.

The pump portion 25 incorporates a pump machine member 26 formed with an inclined plate piston pump. Hence, the pump portion 25 is provided with an inclined plate 27 (see FIG. 3); as an inclined plate angle Rs that is the inclination angle of the inclined plate 27 is increased, the stroke of a pump piston in the pump machine member 26 is increased and thus a discharge flow rate is increased, whereas, as the inclined plate angle Rs is decreased, the stroke of the pump piston is decreased and thus the discharge flow rate is decreased. Therefore, by setting the inclined plate angle Rs at predetermined angles, it is possible to set fixed discharge flow rates Qm and Qs at which discharge flow is fixed to predetermined levels, namely, a high fixed discharge flow rate Qm and a low fixed discharge flow rate Qs that is lower than the high fixed discharge flow rate Qm. Thus, the inclined plate 27 is provided with an inclined plate switching cylinder 28 and a return spring 29; the inclined plate switching cylinder 28 is connected through a switching valve (an electromagnetic valve) 30 to the discharge port of the pump portion 25 (the pump machine member 26). In this way, it is possible to switch the angle of the inclined plate 27 with the inclined plate switching cylinder 28. A pressure sensor for detecting the discharge pressure (load pressure) of the pump portion 25 is further connected to the discharge port of the pump portion 25.

Incidentally, since the variable discharge hydraulic pump 2x variably controls the number of rotations of the servo motor 3s to vary the discharge flow rate (discharge pressure), it is necessary not only to fix the fixed discharge flow rates Qm and Qs set by the inclined plate angle Rs so that they are not varied when the control is performed but also to switch the fixed discharge flow rate during a very short period when the control is not performed. Thus, as described above, the inclined plate switching cylinder 28 is connected through the switching valve 30 to the discharge port of the pump portion 25 (the pump machine member 26), and the opening and closing of the switching valve 30 is controlled to vary the inclined plate angle Rs; in this case, the selectable inclined plate angles Rs are two angles, that is, large and small angles. With this variable discharge hydraulic pump 2x, since only one variable discharge hydraulic pump 2x allows an operation to be performed, it is possible not only to smoothly switch between the fixed discharge flow rates Qm and Qs but also to advantageously help reduce the size of the entire hydraulic circuit used for performing the control method according to the present invention. The hydraulic drive portion 21 variably controls the number of rotations of the servo motor 3s to allow the discharge flow rate and discharge pressure of the variable discharge hydraulic pump 2x to be varied. Thus, it is possible not only to drive and control the cylinders 13a, 13c, 13d and 13e and the measurement motor 13b but also to control the operation processes in the molding cycle.

Figure 3:
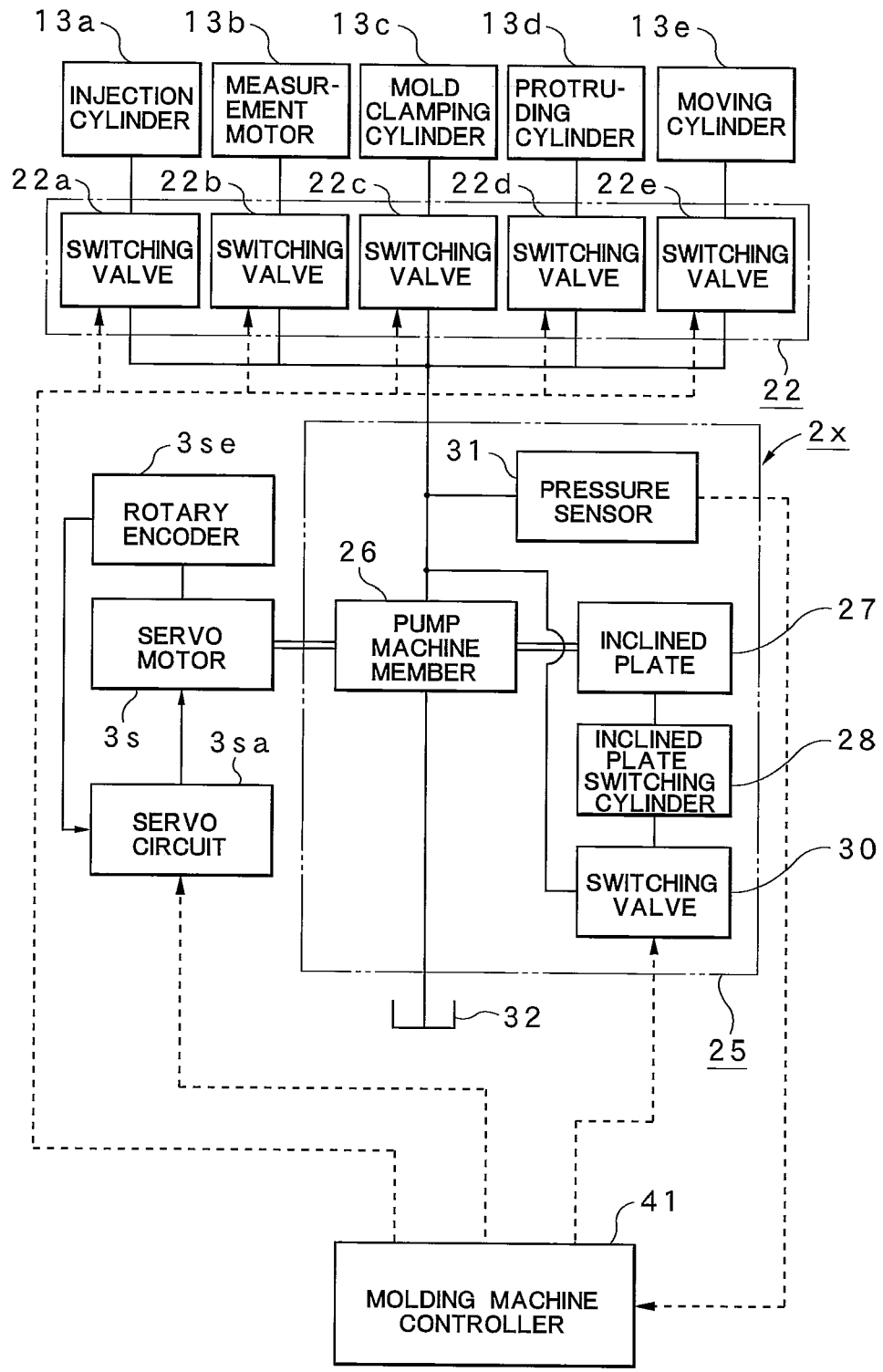
FIG. 3 is a block circuit diagram of the hydraulic drive portion in the injection molding machine.

On the other hand, the inlet port of the pump portion 25 is connected to an oil tank 32, and the discharge port of the pump portion 25 is connected to the primary side of the switching valve circuit 22; the secondary side of the switching valve circuit 22 is connected, as shown in FIG. 3, to the injection cylinder 13a, the measurement motor 13b, the mold clamping cylinder 13c, the protruding cylinder 13d and the injection device moving cylinder 13e that constitute the hydraulic actuator in the injection molding machine M. Hence, the switching valve circuit 22 is provided with switching valves (electromagnetic valves) 22a, 22b, 22c, 22d and 22e that are connected to at least the injection cylinder 13a, the measurement motor 13b, the mold clamping cylinder 13c, the protruding cylinder 13d and the injection device moving cylinder 13e, respectively. Each of the switching valves (22a . . . ) is composed of one or two or more valve components, required additional hydraulic components and the like, and has switching functions of supplying, stopping and discharging operation oil to and from at least the injection cylinder 13a, the measurement motor 13b, the mold clamping cylinder 13c, the protruding cylinder 13d and the injection device moving cylinder 13e.

The reference numeral 41 represents a molding machine controller. As shown in FIG. 3, the servo motor 3s is connected through the servo circuit 3sa to the molding machine controller 41; the rotary encoder 3se incorporated in the servo motor 3s is connected to the servo circuit 3sa. Moreover, the switching valves 22a, 22b, 22c, 22d and 22e formed with electromagnetic valves and a switching valve 30 and furthermore a pressure sensor 31 are connected to the molding machine controller 41. The molding machine controller 41 has a computing function to control the entire injection molding machine M and performs control processing including various sequence controls and computation processing, and particularly stores a control program (a processing program) for performing the control method according to the present invention.

The method of controlling an injection molding machine according to this embodiment will now be specifically described with reference to FIGS. 1 to 4.

The two different fixed discharge flow rates Qm and Qs corresponding to the operation processes in the molding cycle, namely, the high fixed discharge flow rate Qm and the low fixed discharge flow rate Qs, which is lower than the high fixed discharge flow rate Qm are preset. Among the two fixed discharge flow rates Qm and Qs, the low fixed discharge flow rate Qs sets a standard discharge flow rate. Thus, the inclined plate angle Rs is set at a relatively small angle (a small-capacity side). In contrast, the high fixed discharge flow rate Qm can be set greater than the low fixed discharge flow rate Qs, specifically, can be set about twice greater than the low fixed discharge flow rate Qs. Thus the inclined plate angle Rs is set at a relatively large angle (a large-capacity side). Since, in particular, the operation process using the high fixed discharge flow rate Qm may be completed in a short period, even if it is likely that the servo motor 3s is adversely affected when the operation process continues for a relatively long period, the discharge flow rate can be set such that the servo motor 3s is little affected, provided that the operation process continues for a relatively short period (about a few seconds). Specifically the discharge flow rate can set such that the output of the servo motor 3s (the drive motor 3) is greater than the rated output, for example, can be set on a large-capacity side such that the output is about 130% of the rated output. Hence, the low fixed discharge flow rate Qs can be set at about one-second of the high fixed discharge flow rate Qm.

Figure 4:
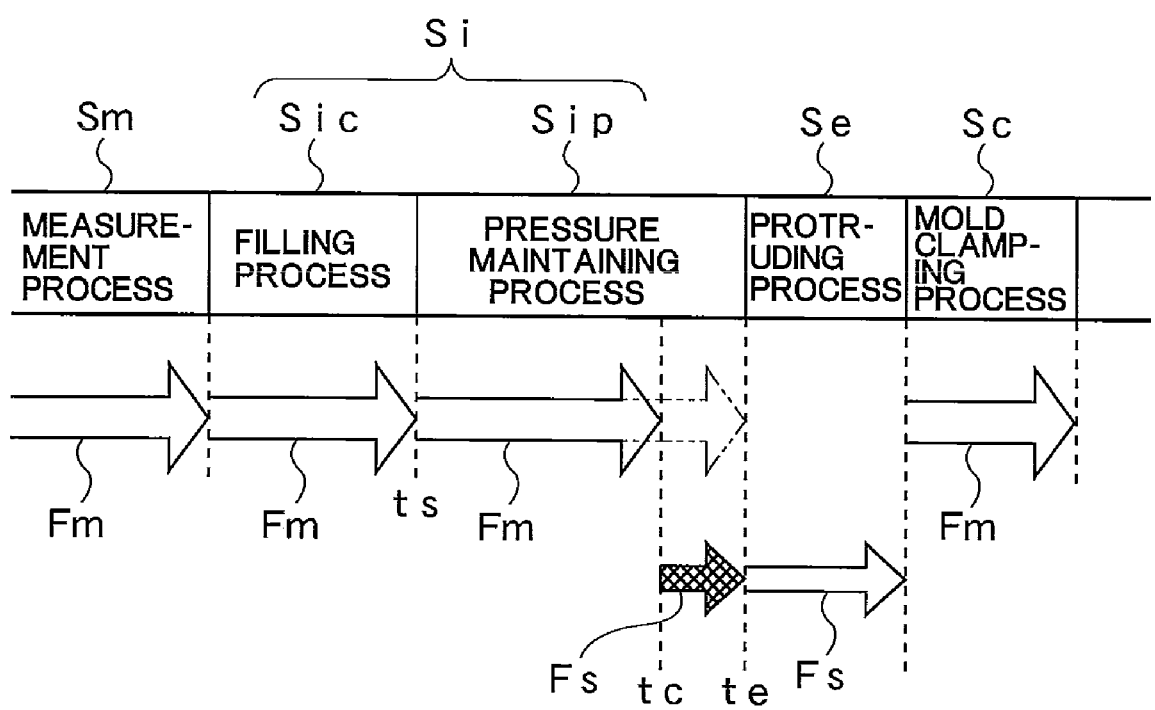
FIG. 4 is a diagram showing a molding cycle (an operation process) used for performing the control method.

The fixed discharge flow rates Qm and Qs applied to the operation processes in the molding cycle are set. In the following description, when the discharge flow rate is set at the high fixed discharge flow rate Qm, such a mode is refereed to as a "high flow mode Fm", and when the discharge flow rate is set at the low fixed discharge flow rate Qs, such a mode is refereed to as a "low flow mode Fs". The operation processes in the molding cycle include, as shown in FIG. 4, the main processes such as a measurement process Sm, a filling process Sic, a pressure maintaining process Sip, a protruding process Se and a mold clamping process Sc. FIG. 4 shows an example of a mode switching pattern in which the measurement process Sm is set at the high flow mode Fm, the filling process Sic is set at the high flow mode Fm, the pressure maintaining process Sip is set at the high flow mode Fm, the protruding process Se is set at the low flow mode Fs and the mold clamping process Sc is set at the high flow mode Fm. The mode switching pattern is arbitrarily set; as in Patent literature 1 described previously, it is possible to set the filling process Sic such that the modes Fm and Fs are differently applied according to the magnitude of the injection rate or set the pressure maintaining process Sip such that the modes Fm and Fs are differently applied according to the length of a maintenance period.

Limit conditions for thresholds for the load condition of the servo motor 3s are set. In this case, the limit conditions are set by a load pressure Ps, particularly with consideration given to the limit within which the servo motor 3s can be prevented from being stopped (tripped) due to overload. Thus, in a case where a load pressure at which the servo motor 3s is stopped by overload is known, with consideration given to a predetermined margin and the like, the load pressure Ps can be set, as limit conditions, at a level that is slightly lower than the known load pressure. When the limit conditions are set by the load pressure Ps in this way, the load condition of the servo motor 3s can be accurately detected, and this allows the operation to be advantageously performed with ease and accuracy.

Figure 1:
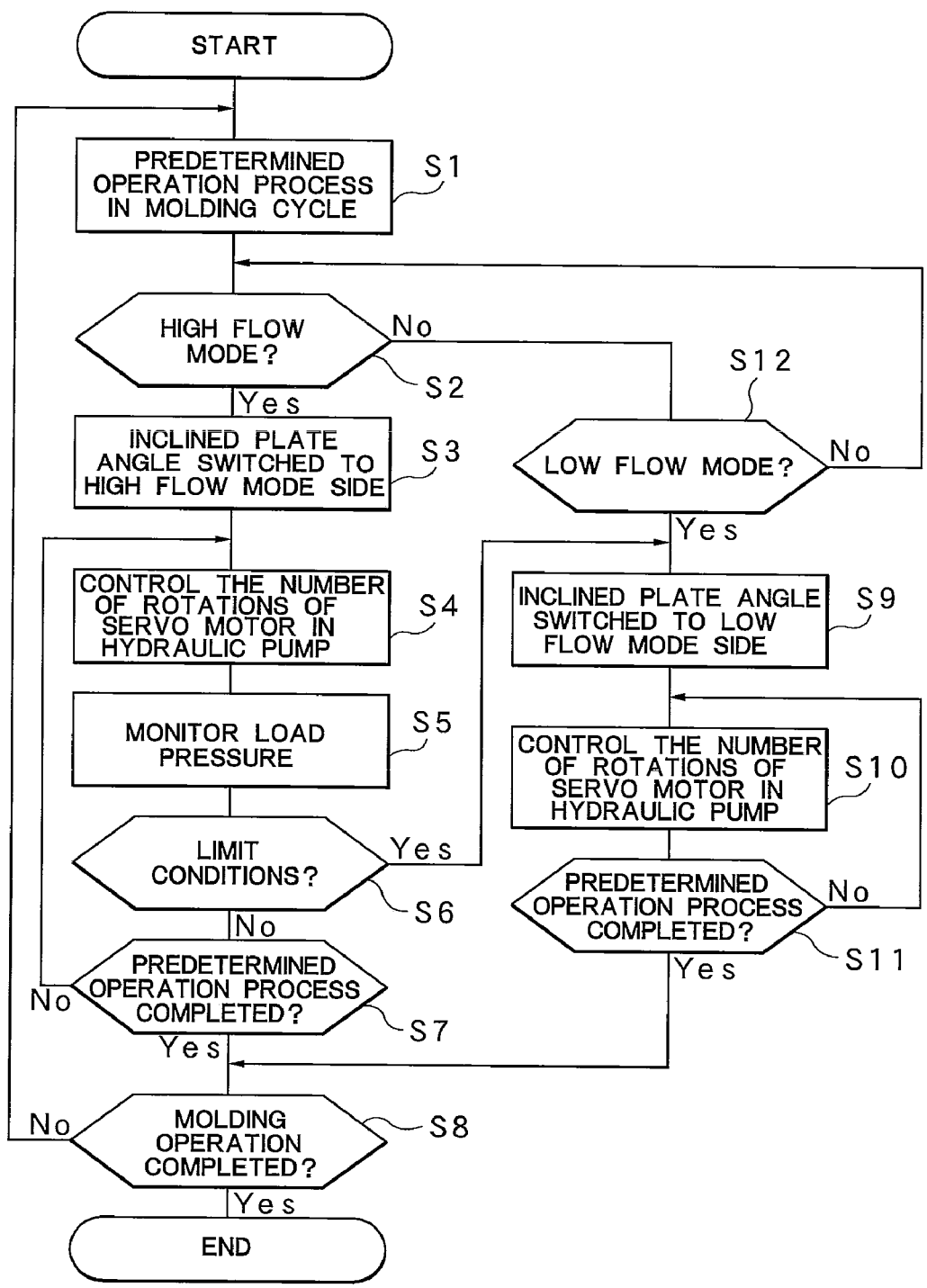
FIG. 1 is a flow chart showing a processing procedure in a method of controlling an injection molding machine according to a preferred embodiment of the present invention.

The processing procedure for performing the control will now be specifically described, with reference to FIGS. 2 to 4, according to a flow chart shown in FIG. 1.

It is assumed that the injection molding machine M is now in the process of performing molding, that the filling process Sic, in particular, in the molding cycle shown in FIG. 4 is completed and that the process proceeds to the pressure maintaining process Sip, which is a predetermined operation process (Step 1). In this case, according to a preset mode switching pattern, since the high flow mode Fm is used, the inclined plate angle Rs is switched to the high flow side (Steps S2 and S3). Specifically, a predetermined switching signal is fed to the switching valve 30 from the molding machine controller 41, and the inclined plate angle Rs is switched to the inclined plate angle Rs in which the angle of the inclined plate 27 is large. The variable discharge hydraulic pump 2x operates as the large-capacity hydraulic pump 2 that performs discharge at the high fixed discharge flow rate Qm. In an example shown in the figure, since the filling process Sic in the preceding stage uses the high flow mode Fm, the mode remains the same without switching in the pressure maintaining process sip.

Then, in the pressure maintaining process Sip, in order for pressure to be maintained, the pressure is controlled by feedback so that the pressure reaches a preset target pressure. In this case, the pressure is controlled by variably controlling the number of rotations of the servo motor 3s (Step S4). In FIG. 4, the symbol ts represent the starting point for performing the pressure maintaining process Sip. During the control, a load pressure obtained from the pressure sensor 31 is fed to the molding machine controller 41 and the load pressure is monitored (Step S5). When the pressure maintaining process Sip is normally performed, an excessive load is not generated, and a period during which the pressure maintaining process Sip is performed is relatively short, with the result that preset limit conditions (the load pressure Ps) are not reached and, as represented by a dotted-line arrow, the entire pressure maintaining process Sip is completed (Steps S6, S7 and S8).

It is assumed that, in contrast, a failure or other problem occurs in the pressure maintaining process Sip and thus a load pressure is increased to reach the limit conditions (the load pressure Ps). In this case, based on the load pressure obtained from the pressure sensor 31, the mode is immediately switched to the low flow mode Fs (Steps S6 and S9). Specifically, a predetermined switching signal is fed to the switching valve 30 from the molding machine controller 41, and the inclined plate angle Rs is switched to the inclined plate angle Rs in which the angle of the inclined plate 27 is small, with the result that the variable discharge hydraulic pump 2x operates as the small-capacity hydraulic pump 2 that performs discharge at the low fixed discharge flow rate Qs. This greatly reduces the load to the servo motor 3s. In the case of the low flow mode Fs, the pressure is basically controlled by variably controlling the number of rotations of the servo motor 3s (Step S10). Then, the control is performed in the low flow mode Fs until the pressure maintaining process Sip (the predetermined operation process) is completed (Step S11). In this case, since the screw 11 is little moved in the latter stage of the pressure maintaining process Sip, if the mode is switched to the low flow mode Fs here, there is no possibility that the control cannot be performed. In FIG. 4, the symbol tc represents the switching point from the high flow mode Fm to the low flow mode Fs, and the symbol te represents the completion point of the pressure maintaining process Sip; in this figure, a solid-line arrow indicates that the operation is performed in the low flow mode Fs from the switching point tc to the completion point te of the pressure maintaining process Sip.

According to the control method of this embodiment, when molding is performed, the predetermined operation process is controlled by setting the mode at the high fixed discharge flow rate Qm and the predetermined operation process is also controlled by monitoring the load condition of the drive motor 3 and switching, when the load condition reaches the limit conditions, the mode to the low fixed discharge flow rate Qs. Therefore, even if an excessive load occurs due to any failure or the predetermined operation process is performed for a longer period, it is possible to prevent the drive motor 3 from being stopped (tripped) due to overload. Thus, since the production can be performed continuously without the molding cycle (the molding operation) being interrupted, it is possible not only to increase production efficiency but also to help improve the quality and yield of molded products. It is also possible not only to prevent the drive motor 3 from being overloaded but also to set the drive motor 3 at an optimum threshold (the limit conditions). This makes it possible to avoid failures that impose an excessive and unnecessary burden on the drive motor 3 (the hydraulic pump 2) or increase consumption energy, with the result that an optimum operation condition can be set. In particular, in this embodiment, since the injection process Si including the filling process Sic and the pressure maintaining process Sip is used as the predetermined operation process, the injection process Si, where the problems to be solved by the present invention occur significantly, can be improved, with the result that the most effective performance can be obtained.

When the load pressure reaches the limit conditions, a predetermined abnormality process may be performed. As the abnormality process, various abnormality processes can be used such as a process of display by at least one or both of an error message and a warning lamp, a notification by a warning buzzer or communication and control for abnormality, as necessary. By performing such an abnormality process, it is possible to quickly detect abnormality to take a measure for the abnormality. This advantageously makes it possible to minimize influence on the entire production.

Then, when the above-described pressure maintaining process Sip is completed, the mold is opened, and thereafter the protruding process Se is performed. In the case of the mode switching pattern shown in the figure, since the protruding process Se is set at the low flow mode Fs, the protruding process Se is applied to the predetermined operation process in "Step 1" in the flow chart of FIG. 1, and a flow in the low flow mode Fs in "steps S12, S9 . . . " is applied. In the other operation processes such as the measurement process Sm and the mold clamping process Sc, a similar control is performed according to the mode switching pattern. As described above, a similar control can be applied to the predetermined operation processes such as the injection process Si including the filling process Sic and the pressure maintaining process Sip, the measurement process Sm, the mold clamping process Sc.

Although the preferred embodiment is described in detail above, the present invention is not limited to this embodiment, and any modifications, additions and removals in the detailed configuration, the manner, the quantity, the value and the like are possible without departing from the spirit of the present invention.

For example, although the above-described embodiment discusses, by way of example, the hydraulic pump 2 that can set the fixed discharge flow rates Qm and Qs, using the variable discharge hydraulic pump 2x that can set the fixed discharge flow rates Qm and Qs by varying the inclined plate angle Rs, any other pump such as a multi-unit hydraulic pump in which at least two hydraulic pump units are connected in parallel may be used. In this case, the capacities of the these hydraulic pump units may be different or the same. Thus, with such a multi-unit hydraulic pump, it is possible to perform the operation by using simple pump units in combination, and this advantageously helps reduce the entire cost and diversify the control.

Although the drive motor 3 is described by way of example, using the servo motor 3s, any other drive motor 3 that has the same function may be used. Although a description is given of the case where two fixed discharge flow rates Qm and Qs are set, this description is not intended to avoid a case where three or more fixed discharge flow rates Qm . . . are set. Although a description is given of the case where the load pressure Ps is used as the limit conditions, an elapsed time Ts in a predetermined operation process may be used, or both the load pressure Ps and the elapsed time Ts may be used. When the elapsed time Ts is used as the limit conditions or both the elapsed time Ts and the load pressure Ps are used, it is possible to accurately detect the load condition of the drive motor 3 to advantageously perform the control method of the present invention easily and accurately.

INDUSTRIAL APPLICABILITY

The control method of the present invention can be utilized in various types of injection molding machines that have an operation process of varying the number of rotations of a drive motor for driving a hydraulic pump to perform control.

Reference Signs List

M: Injection molding machine, 2: Hydraulic pump, 2x: Variable discharge hydraulic pump, 3: Drive motor, 3s: Servo motor, 3sa: Servo circuit, Si: Injection process, Sic: Filling process, Sip: Pressure maintaining process Citation List
  Patent Literature 1
  JP2007-69500

The invention claim is:

1. A method of controlling an injection molding machine that variably controls a number of rotations of a drive motor driving a hydraulic pump to control each operation process in a molding cycle,
   wherein, as the hydraulic pump, a hydraulic pump that can set at least a high fixed discharge flow rate and a low fixed discharge flow rate lower than the high fixed discharge flow rate is used, limit conditions for a threshold for a load condition of the drive motor are preset and, during a molding operation, by setting a predetermined operation process at the high fixed discharge flow rate, said operation process is controlled and, when the load condition of the drive motor is monitored and the load condition reaches the limit conditions, the hydraulic pump is switched to the low fixed discharge flow rate to control said predetermined operation process.

2. The method of controlling an injection molding machine according to claim 1,
   wherein the limit conditions are set at a range within which the drive motor can be prevented from being stopped due to overload.

3. The method of controlling an injection molding machine according to claim 1,
   wherein the high flow rate is set such that an output of the drive motor is higher than a rated output.

4. The method of controlling an injection molding machine according to claim 1,
   wherein the limit conditions are set by a load pressure.

5. The method of controlling an injection molding machine according to claim 1,
   wherein the limit conditions are set by an elapsed time.

6. The method of controlling an injection molding machine according to claim 1,
   wherein the limit conditions are set by a load pressure and an elapsed time.

7. The method of controlling an injection molding machine according to claim 1,
   wherein, as the drive motor, a servo motor connected to a servo circuit is used.

8. The method of controlling an injection molding machine according to claim 1,
   wherein, as the hydraulic pump, a variable discharge hydraulic pump is used that can set the fixed discharge flow rate by varying an inclined plate angle.

9. The method of controlling an injection molding machine according to claim 1,
   wherein at least an injection process including a filling process and a pressure maintaining process is applied to the predetermined operation process.

10. The method of controlling an injection molding machine according to claim 1,
    wherein, when the limit conditions are reached, an abnormality process is performed.

11. The method of controlling an injection molding machine according to claim 10,
    wherein the abnormality process includes a process of display by at least one or both of an error message and a warning lamp.

* * * * *